United States Patent

Paquet et al.

[11] Patent Number: 5,248,361
[45] Date of Patent: Sep. 28, 1993

[54] METHOD OF MANUFACTURING LAMINATED FLEXIBLE BEARINGS, IN PARTICULAR FOR ENGINE NOZZLE JOINTS

[75] Inventors: Robert E. Paquet, Cestas; André Negrier; Régis L. Ferment, both of Saint Medard en Jalles, all of France

[73] Assignee: Societe Europeenne de Propulsion, Suresnes, France

[21] Appl. No.: 869,144

[22] Filed: Apr. 14, 1992

[30] Foreign Application Priority Data

Apr. 15, 1991 [FR] France .................... 91 04594

[51] Int. Cl.⁵ ............... B31C 13/00; B65H 54/00
[52] U.S. Cl. .................. 156/171; 156/188; 156/192; 156/193; 156/189; 384/129; 29/898
[58] Field of Search ............... 29/898.055, 898; 156/158, 172, 192, 245, 171, 174, 188, 193; 102/531; 384/129; 403/291; 285/45

[56] References Cited

U.S. PATENT DOCUMENTS

| 3,303,079 | 2/1967 | Carter | 156/172 |
|---|---|---|---|
| 3,627,607 | 12/1971 | Benzinger | 156/193 X |
| 3,850,722 | 11/1975 | Kreft | 156/172 |
| 3,890,183 | 6/1975 | Farnham | 156/193 |
| 3,941,433 | 3/1976 | Dolling | 384/129 |
| 3,952,506 | 4/1976 | Macbeth | 102/531 X |
| 3,958,840 | 5/1976 | Hickox | 384/129 |
| 4,570,315 | 2/1986 | Kramer | 29/898.055 |
| 4,677,721 | 7/1987 | Kramer | 156/192 X |
| 4,708,758 | 11/1987 | McGregor | 156/245 |
| 4,718,959 | 1/1988 | Kramer | 29/898.055 |

FOREIGN PATENT DOCUMENTS

0337648 10/1989 European Pat. Off. .

OTHER PUBLICATIONS

"Ontwerpen in Vezelversterkte Kunststoffen", A. Nijhof, 1983, pp. 12.11–12.12.

*Primary Examiner*—David A. Simmons
*Assistant Examiner*—C. Rainwater
*Attorney, Agent, or Firm*—Weingarten, Schurgin, Gagnebin & Hayes

[57] ABSTRACT

To make a laminated flexible bearing constituted by rigid reinforcing layers made of composite material alternating with layers of rubber or elastomer, each reinforcing layer is formed by winding a resin preimpregnated thread directly on the underlying layer of rubber or elastomer. Advantageously, the flexible bearing is made by alternating layers formed by winding a resin pre-impregnated thread and layers formed of non-vulcanized rubber or elastomer, after which the resin is polymerized and the rubber or elastomer is vulcanized simultaneously.

4 Claims, 4 Drawing Sheets

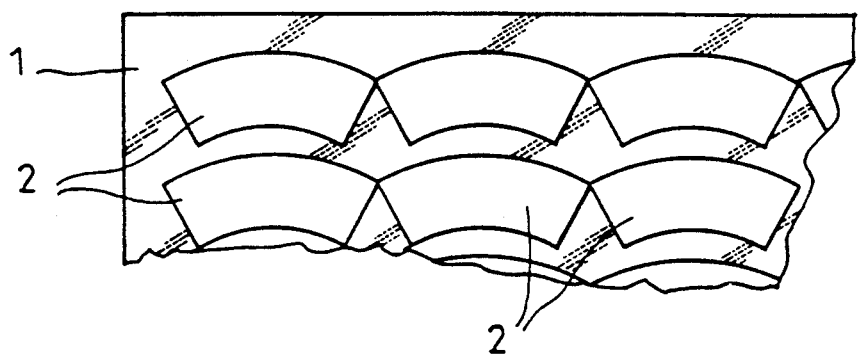
fig_1
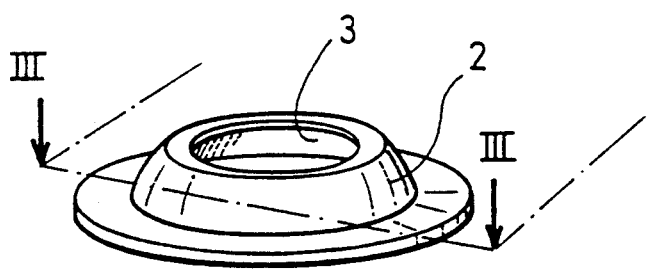
fig_2
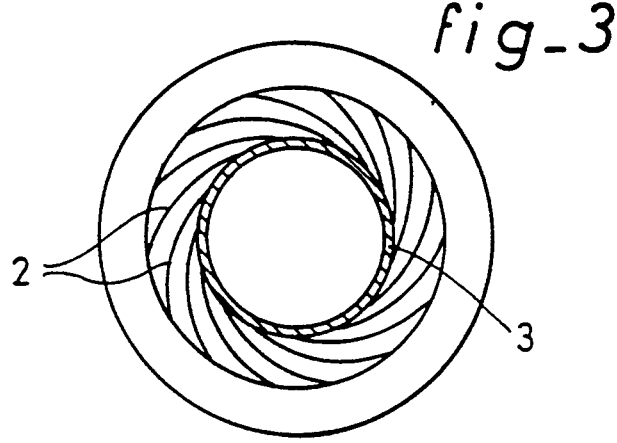
fig_3
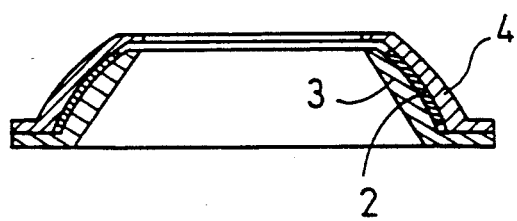
fig_4

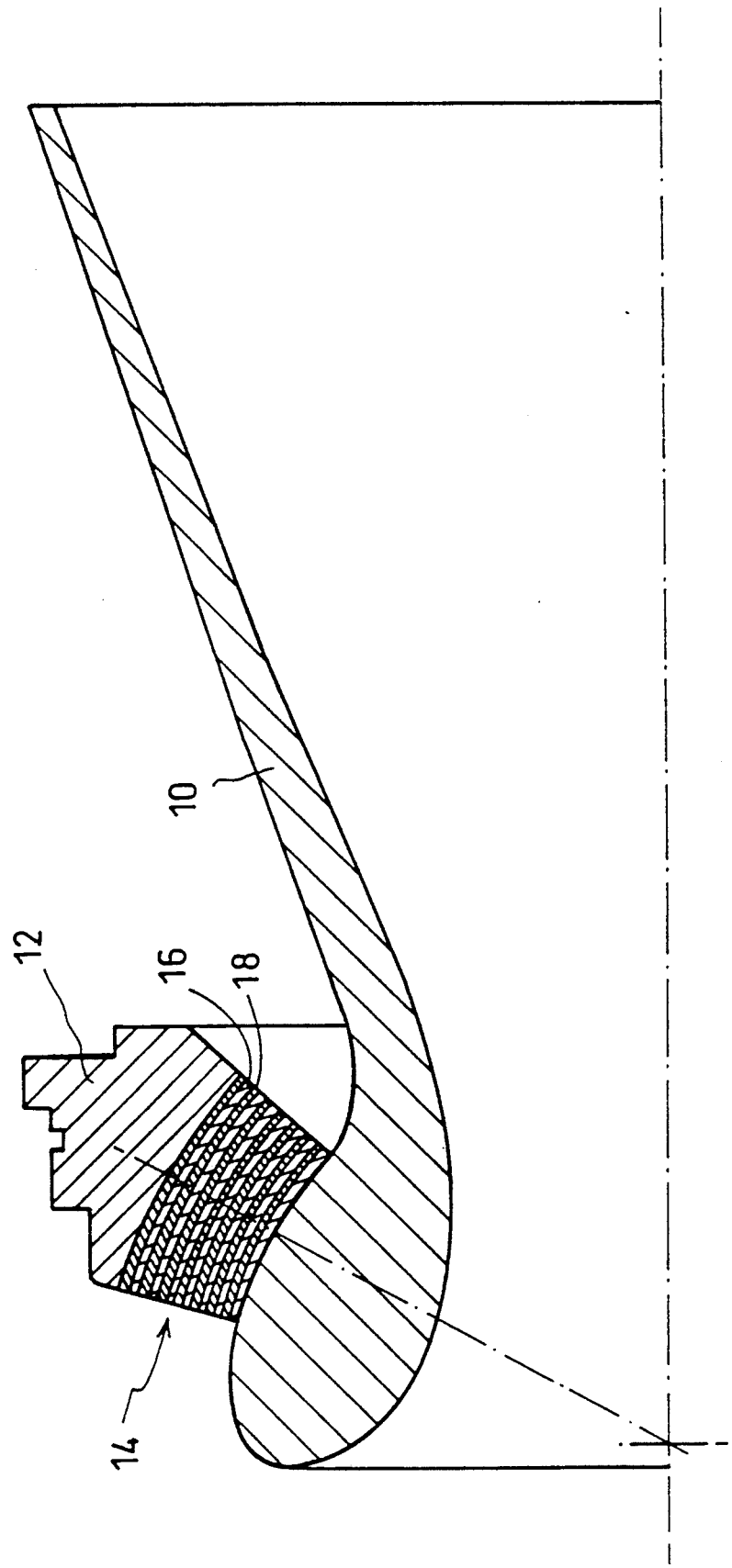
fig_5

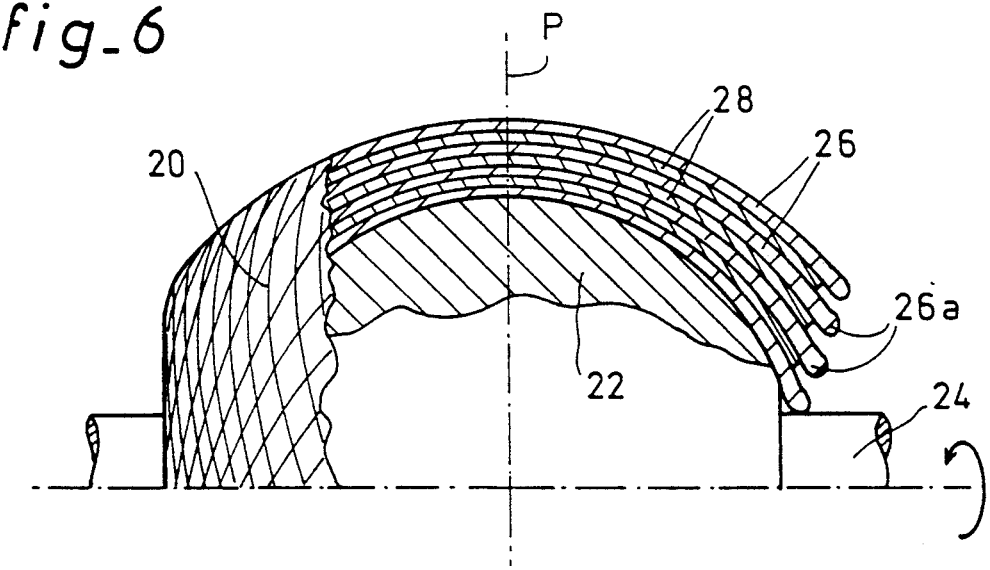
fig_6
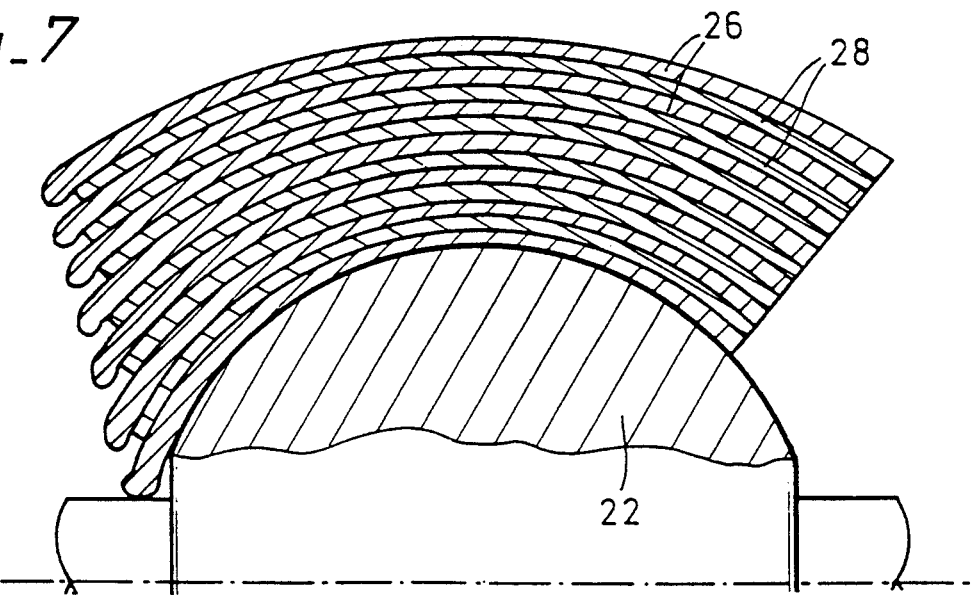
fig_7
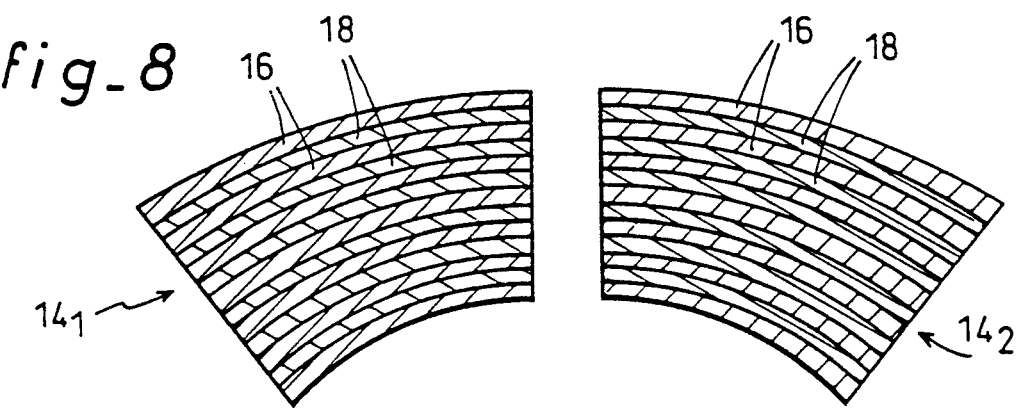
fig_8

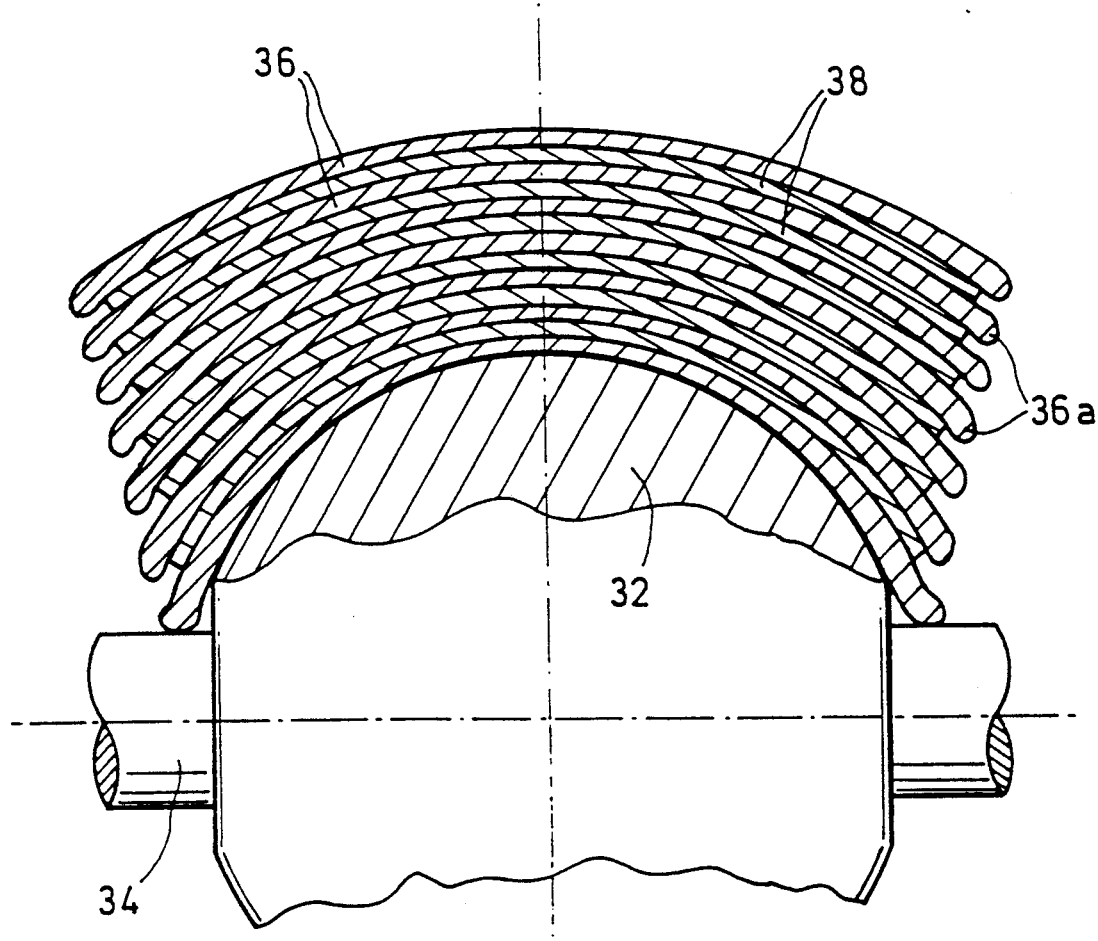
fig_9

METHOD OF MANUFACTURING LAMINATED FLEXIBLE BEARINGS, IN PARTICULAR FOR ENGINE NOZZLE JOINTS

The present invention relates to the manufacture of laminated flexible bearings.

BACKGROUND OF THE INVENTION

Laminated supports or flexible bearings are made up of layers of rigid material or "reinforcement" alternating with layers of resiliently deformable material, typically rubber or elastomer, which layers adhere securely to the reinforcement. Such flexible bearings are characterized by high strength against compression forces exerted perpendicularly to the layers, and by a relatively high capacity for resilient deformation in shear parallel to the layers.

A particular field of application for the invention is laminated spherical flexible bearings as used for forming joints between parts that may pivot relative to each other through a small angle about a pivot center. In laminated spherical flexible bearings, the reinforcement and the layers of rubber have surfaces in the form of spherical zones.

As particular examples of possibilities on which laminated spherical flexible bearings are used, mention may be made of the joints connecting an up duct to a submarine well-head, or the joints connecting a nozzle to a rocket body.

For example, with laminated flexible bearings for a nozzle, proposals have been made to replace the traditionally metal reinforcement with reinforcement made of composite material enabling a significant mass saving to be obtained while still providing very good mechanical performance under the conditions in which such nozzles are used. A particular material constituting such reinforcement is carbon-epoxy, i.e. a material constituted by carbon fiber reinforcement embedded in a matrix of epoxy resin.

A method currently used by the Applicant of the present application for making carbon-epoxy spherical composite reinforcements, consists in draping and molding layers of carbon cloth that have been pre-impregnated with epoxy resin. More precisely, the method comprises the following steps:

cutting out layers in the form of annular sectors 2 from pre-impregnated carbon cloth 1, the shape of the sectors being close to that of developed truncated cones FIG. 1);

draping the pre-impregnated layers of cloth in a rosette pattern on a male mold 3 having a surface in the form of a spherical zone corresponding to the inside surface of the spherical reinforcement to be made (FIGS. 2 and 3);

compacting the layers in a vacuum by means of a membrane;

installing them in a female mold 4 having a surface in the form of a spherical zone corresponding to the outside surface of the reinforcement to be made (FIG. 4);

polymerizing the assembly while under pressure; and demolding the reinforcement.

The above method is very difficult to implement: it includes steps that must be performed manually and that require know-how and skills.

In addition, while being installed in the female mold, the layers may slide, thereby giving rise to folds (faults) and changing the distribution of the reinforcing fibers between the larger diameter and the smaller diameter of the reinforcement.

Furthermore, after demolding, the effect of releasing internal stresses can cause deformation in the reinforcement which can be detected only by inspection that is thorough.

With that method, it is also difficult to obtain reinforcement of varying thickness even though that can be desirable in some cases, particularly for increasing the mechanical strength of a flexible bearing in the vicinity of its small diameter where the largest forces are applied.

An object of the present invention is thus to provide a method of making laminated flexible bearings while avoiding the above drawbacks, i.e. a method that is simpler to implement and that avoids creating faults in reinforcement while making it possible to provide reinforcement of varying thickness.

SUMMARY OF THE INVENTION

According to the invention, this object is achieved by a method in which each layer of reinforcement deposited on a layer of rubber or elastomer is formed by winding a resin-pre-impregnated thread directly onto the underlying layer of rubber or elastomer.

Advantageously, the flexible bearing is manufactured by alternating layers formed by winding a resin pre-impregnated thread and layers formed of non-vulcanized rubber or elastomer, followed by simultaneously polymerizing the resin and vulcanizing the rubber or the elastomer.

The method of the invention provides significant advantages.

Firstly, it makes it possible to simplify tooling. Thereafter, the number of operations is reduced, as is the number of manual acts required, thereby significantly reducing manufacturing costs.

In addition, by using a winding technique, the distribution of reinforcing fibers within the reinforcement is easily monitored, thus avoiding zones with faults.

Furthermore, winding means that the reinforcing fibers are under tension, which means that they work under better conditions. Consequently, a given thickness of reinforcement made by winding provides better performance than the same thickness of reinforcement made by draping.

Finally, winding makes it very easy to modulate the thickness of the reinforcement, in particular to take account of the fact that greater forces are applied on certain portions of a flexible bearing, and this advantage is far from being negligible.

BRIEF DESCRIPTION OF THE DRAWINGS

An implementation of the invention is described by way of example with reference to the accompanying drawings, in which:

Above-described FIGS. 1 to 4 show the steps of a prior method of manufacturing composite reinforcement, FIG. 3 being a section view on plane III of FIG. 2;

FIG. 5 is a fragmentary section view of a spherical flexible bearing for a rocket nozzle;

FIGS. 6 to 8 are diagrams showing steps in a method of the invention for making a spherical joint flexible bearing of the type shown in FIG. 5; and FIG. 9 is a diagram showing another implementation of the method of the invention.

DETAILED DESCRIPTION

In a rocket engine, in particular in a large propellant rocket engine, the nozzle is connected to the engine body in such a manner as to be pivotable through a relatively small angle of rotation about a center of rotation.

To this end, it is conventional to connect the nozzle 10 (FIG. 5) to the body 12 of the engine by means of a laminated spherical flexible bearing or joint 14 located within the throat of the nozzle. The laminated flexible bearing 14 is made up of layers of rigid material or "reinforcement" 16 interposed with layers of rubber or elastomer 18 to which the reinforcement 16 is firmly secured. Each layer of the laminate extends over a zone of a sphere whose center O is the pivot center of the joint, and each is of a diameter that increases from its end closest to the axis of the nozzle to its end furthest therefrom. In the example shown, the reinforcement 18 is of greater thickness in its portion located close to the small diameter than in its portion located close to its large diameter, thereby imparting greater strength to the flexible bearing in the portion thereof which is subjected to the greatest forces.

In accordance with the invention, each part of reinforcement 16 is made of a composite material obtained by winding impregnated thread directly onto the underlying layer of rubber or elastomer.

The thread is made of continuous filaments having good mechanical properties and capable, in the intended application, of withstanding relatively high temperatures, for example filaments made of carbon fiber.

The thread is impregnated with a resin which, after polymerization, provides the matrix of the composite material constituting the reinforcement. The resin may be an epoxy resin, for example.

As shown in FIG. 6 which is a view partially in section, the laminated flexible bearing is made on a spherical mandrel 22 mounted on a rotary drive shaft 24. The shape of the outside surface of the mandrel corresponds to the shape of the inside surface of the flexible bearing that is to be made. In this example, two flexible bearings are made simultaneously on either side of a midplane P that contains the large diameter of the mandrel 22.

Alternating layers 26 obtained by winding resin-impregnated threads 20 and layers 28 obtained by draping sheets of non-vulcanized rubber or elastomer are formed successively on the mandrel 22. The number and thickness of the layers 26 and 28 are determined to correspond to the number and thickness of the layers of reinforcement 16 and of rubber or elastomer 18 required in the flexible bearing to be manufactured.

The first layer 26 is wound directly on the mandrel 22, and the following layers 26 are wound directly on the underlying layers 28.

For each layer 26, the thread 20 is wound to form a layer whose thickness increases from its large diameter (middle portion of the mandrel furthest from the axis of rotation) towards its small diameter (ends of the mandrel closer to the axis of rotation). It may be observed that the winding technique makes it possible to obtain such thickness variation quite naturally and is thus entirely from this point of view advantageous. Winding ends 26a are formed along the end edges of the layers 26.

The assembly constituted by the mandrel 22 and the alternating layers 26 and 28 is placed in an oven for polymerizing the resin impregnating the winding thread and for vulcanizing the rubber or elastomer of the layers 28. Polymerization and vulcanization are thus performed simultaneously.

After polymerization and vulcanization, the mandrel 22 may be mounted, for example, on a lathe where the winding ends 26a are removed and where the ends located within the small diameter are simultaneously machined (FIG. 7).

Finally, the assembly comprising the layers 26 and 28 is sectioned on the plane P, thereby releasing two flexible bearings 14{1} and 14{2} that have been manufactured simultaneously (FIG. 8).

In the example described above, both flexible bearings $14_1$ and $14_2$ are identical. Clearly it is possible to produce two different flexible bearings simultaneously by using a mandrel in the shape of two hemispherical sections that meet in the plane P while not being symmetrical to each other about said plane.

The method of manufacturing a laminated flexible bearing is considerably simplified by making successive layers by winding resinimpregnated thread and by draping sheets of non-vulcanized rubber or elastomer, followed by simultaneously polymerizing the resin and vulcanizing the rubber or elastomer.

The method also makes it possible to make one-piece flexible bearings whose outer (or inner) diameters between their axial ends are greater than the diameters of said ends. Under such circumstances, it would not be possible to make the flexible bearing by assembling layers of rubber or elastomer and rigid parts of reinforcement that have been manufactured separately and individually.

Such a flexible bearing is manufactured in the manner described above, with layers 36 obtained by winding a resin-impregnated thread and layers 38 obtained by draping sheets of non-vulcanized rubber or elastomer (FIG. 9) being formed successively and alternately on an internal part 32. The internal part 32 constitutes a mandrel that is rotated on a shaft 34. The layers 36 may be wound so as to be of varying thickness. Winding ends 36a are formed at the edges of the layers 36.

Once the desired number of layers 36 and 38 has been formed, the impregnating resin is polymerized while simultaneously vulcanizing the rubber or elastomer. The winding ends are then eliminated by machining off the axial ends of the flexible bearing. The entire assembly including the internal part 32 can then be mounted.

EXAMPLE

By way of example, the method of the invention as shown in FIGS. 6 to 8 has been performed as follows.

A metal mandrel 22 was used having an outer diameter equal to the inner diameter of the reinforcement.

The layers 26 were wound using carbon thread impregnated with a class 180° C. type Araldite epoxy resin. The carbon thread was a high strength thread sold by the Japanese firm Toray under trade name T300. The layers 26 were made to have a thickness varying between a value of about 3 mm at its edges to a value of about 2 mm in the middle.

The layers 28 were sheets of elastomer based on natural rubber and having an average thickness of about 2 mm.

After forming the layers 26 and 28 up to a total number of 13, the epoxy resin and the elastomer were polymerized and vulcanized simultaneously in an oven at a temperature of about 150° C.

In the flexible bearings obtained after sectioning on the plane P, perfect adhesion was observed between the reinforcement and the layers of elastomer.

In an application to a laminated nozzle flexible bearing, the average thickness of the reinforcement is conventionally in the range 2 mm to 4 mm, and the average thickness of the layers of rubber or elastomer lies in the range 1 mm to 3 mm. The total number of the layers (reinforcement plus layers of rubber or elastomer) is conventionally 9 to 15.

Although the above description relates to spherical laminated flexible bearings, the invention is clearly applicable to laminated flexible bearings of shapes other than spherical, e.g. elliptical.

We claim:

1. A method of manufacturing an asymmetrical, laminated, flexible bearing for an engine-nozzle joint, said bearing having rigid reinforcement layers of a composite material in alternating disposition with resilient layers of an elastomer, comprising the steps of:
   alternately superimposing first layers formed of wound, resin pre-impregnated threads and second layers formed of non-vulcanized rubber or non-vulcanized elastomer, each of said first layers being formed upon an underlying second layer of said non-vulcanized rubber or non-vulcanized elastomer, by winding a resin pre-impregnated thread directly onto said underlying second layer to obtain a first layer of non-uniform thickness; and
   simultaneously polymerizing said resin to obtain said rigid reinforcement layers of said composite material and vulcanizing said non-vulcanized rubber or non-vulcanized elastomer to obtain said resilient layers.

2. A method of manufacturing an asymmetrical, laminated, flexible bearing for an engine-nozzle joint, said bearing having rigid reinforcement layers of a composite material in alternating disposition with resilient layers of an elastomer, comprising the steps of:
   alternately superimposing first layers formed of wound, resin pre-impregnated threads and second layers formed of non-vulcanized rubber or non-vulcanized elastomer, each of said first layers being formed upon an underlying second layer of said non-vulcanized rubber or non-vulcanized elastomer, by winding a resin pre-impregnated thread directly onto said underlying second layer to obtain a first layer of non-uniform thickness, wherein each of said first layers is thicker at a portion thereof having a smaller diameter than at a portion thereof having a larger diameter; and
   simultaneously polymerizing said resin to obtain said rigid reinforcement layers of said composite material and vulcanizing said non-vulcanized rubber or non-vulcanized elastomer to obtain said resilient layers.

3. The method of claim 1, wherein two flexible bearings are simultaneously manufactured by forming said alternating first and second layers on an axisymmetrical mandrel, said mandrel having a diameter which increases between a first axial end of said mandrel and a central portion thereof and decreases between said central portion and a second axial end of said mandrel, and following said step of simultaneous polymerizing and vulcanizing to produce a structure including said rigid reinforcement layers and said resilient layers, said structure is sectioned along a radial plane to release said two flexible bearings from said mandrel.

4. The method of claim 2, wherein two flexible bearings are simultaneously manufactured by forming said alternating first and second layers on an axisymmetrical mandrel, said mandrel having a diameter which increases between a first axial end of said mandrel and a central portion thereof and decreases between said central portion and a second axial end of said mandrel, and following said step of simultaneous polymerizing and vulcanizing to produce a structure including said rigid reinforcement layers and said resilient layers, said structure is sectioned along a radial plane to release said two flexible bearings from said mandrel.

* * * * *